March 31, 1936. W. WILKINSON ET AL 2,035,516
METHOD OF SEPARATING THE CONSTITUENTS OF GASEOUS MIXTURES
Filed Aug. 1, 1934
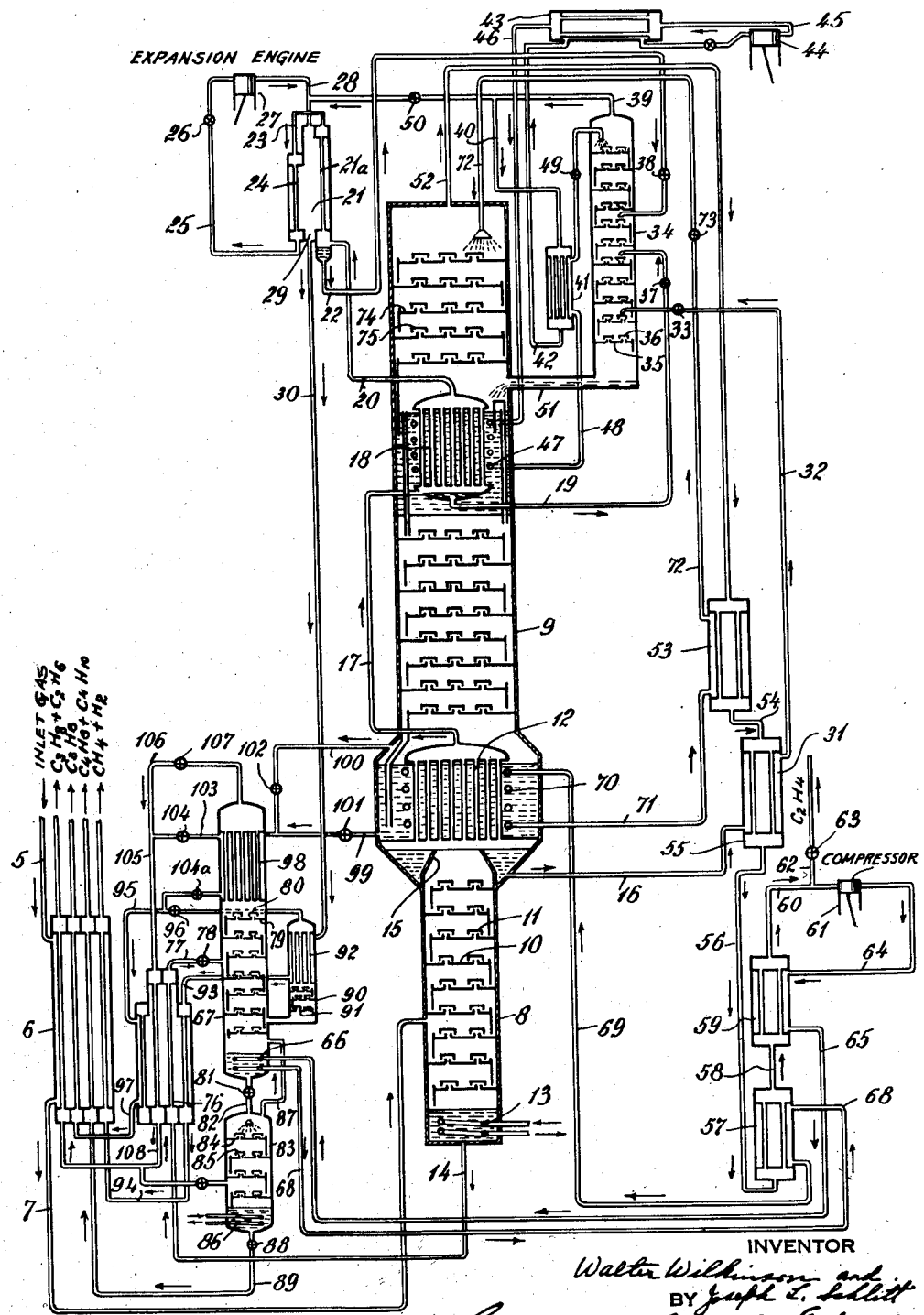
INVENTOR
Walter Wilkinson and
BY Joseph L. Sellett
Pennie, Davis, Marvin & Edmonds
THEIR ATTORNEYS Patented Mar. 31, 1936

2,035,516

UNITED STATES PATENT OFFICE 2,035,516

METHOD OF SEPARATING THE CONSTITUENTS OF GASEOUS MIXTURES

Walter Wilkinson, Rye, N. Y., and Joseph L. Schlitt, Darien, Conn., assignors to Air Reduction Company, Incorporated, New York, N. Y., a corporation of New York Application August 1, 1934, Serial No. 737,952

9 Claims. (Cl. 62—175.5)

This invention relates to a method and apparatus for separating and recovering from a complex mixture of gaseous hydrocarbons, certain constituents such as those belonging to the ethylene series of hydrocarbons, $C_nH_{2n}$. A mixture to which the process forming the subject matter of the present application may be applied, is for example, one obtained by cracking petroleum by-product gases such as methane, ethane, ethylene and propane or by cracking the heavy liquid residues or crude oils obtained in the petroleum industry. The cracked gases to be treated in the following process will thus consist of hydrogen, methane, ethane, propane, butane, ethylene, propylene, butylene and amylene, with possible small percentages of the higher members of both the aliphatic and ethylene series. Small amounts of nitrogen may also be present.

It will be apparent as the description proceeds that the method forming the subject matter of this application accomplishes a very difficult and novel result, that is, the separation of a complex, gaseous, hydrocarbon mixture into its constituents, practically all of the valuable ones of which are obtained in a substantially pure condition. The method is distinguished by the fact that various fractions containing a fewer number of constituents than the original mixture are separated from the original mixture and are then completely separated in auxiliary apparatus. The products of these auxiliary separations which contain ethylene are then returned to the main ethylene rectifier. The invention is generally applicable to gaseous mixtures of varying constituents, but is particularly adaptable to the separation of olefine hydrocarbons, ethylene and propylene from mixtures containing many other hydrocarbons gases, some of which have boiling points higher than that of any desired constituent and others of which have boiling points lower than that of any desired constituent and still others of which have boiling points lying between those of the desired constituents. Mixtures such as those mentioned are produced by "cracking" processes of the petroleum industries.

The two constituents ethylene and propylene have boiling points lying between those of the most volatile constituents (hydrogen and methane) and those of the more condensible constituents such as butane, butylene and heavier hydrocarbons of both aliphatic and ethylene series. The boiling point (—88° C.) of one undesirable constituent, always present in substantial percentage, viz., ethane, lies between the boiling point of ethylene (—103° C.) and that of propylene (—47° C.).

The primary object of the present invention is to recover in substantial purity and singly the first two of the ethylene series constituents of a mixture such as the one above indicated, namely, ethylene and propylene, and to segregate the higher members present, such as butylene and amylene, mixed only with heavier aliphatic hydrocarbons such as butane and pentane.

Another object of the invention is to provide an efficient method of producing the refrigerative effect necessary for the accomplishment of the desired separation.

Other objects and advantages will be apparent as the invention is better understood by reference to the following specification and the accompanying drawing which illustrates diagrammatically an apparatus suitable for the practice of the invention, it being understood that the details of such apparatus, well known in the art, are omitted for the purpose of clarity and that suitable apparatus of varying constructions can be employed to accomplish the purpose of the invention.

The method is designed to meet the pressing need for a continuous commercial operation which will separate the various olefine hydrocarbons, particularly ethylene and propylene, from a complex mixture of hydrocarbons such as is obtained by cracking petroleum hydrocarbons, either gaseous or liquid, derived from the petroleum industry. The result of cracking such hydrocarbon mixtures is to obtain a complex gaseous mixture consisting of hydrogen, methane, ethane, propane, butane, pentane, ethylene, propylene, butylene, amylene, etc. These various hydrocarbons have boiling points over a wide range of variation. Thus at a pressure of 1 atmosphere the boiling points of these constituents are as follows:

| | °C. |
|---|---|
| Hydrogen | —252.54 |
| Methane | —161.6 |
| Ethylene | —103.0 |
| Ethane | —88.7 |
| Propylene | —47.0 |
| Propane | —42.2 |
| Isobutane | —12.2 |
| Isobutylene | —6.6 |
| Normal butylene | —6.1 |
| Normal butane | —0.6 |
| β-butylene | +9.5 |
| Tertiary pentane | +27.95 |
| Secondary pentane | +27.95 |
| Normal pentane | +36.06 |

An analysis typical of mixtures we have separated by the process about to be described, is as follows, the percentages being in mols.

| | Per cent |
|---|---|
| Hydrogen ($H_2$) | 10 |
| Methane ($CH_4$) | 30 |
| Ethylene ($C_2H_4$) | 30 |
| Ethane ($C_2H_6$) | 6 |
| Propane ($C_3H_8$) | 1 |
| Propylene ($C_3H_6$) | 14 |
| Butylenes | 8 |
| Amylene, pentane, benzol and toluol | 1 |

The problem of the separation of the desired constituents, e. g., ethylene, propylene and butylene, from such a mixture is an exceedingly difficult one particularly in that not only does the mixture contain constituents of boiling points both higher and lower than those of any of these desired constituents, but it also contains components whose boiling points are intermediate between those of any two desired constituents. For example, one such component, especially, is ethane, substantial quantities of which always occur in the gaseous mixtures resulting from cracking hydrocarbons either gaseous or liquid.

The difficulties encountered in attempting to separate the olefine hydrocarbons from such a complex mixture by a single continuous process involving only partial liquefaction, evaporation and rectification, are very great for the reason that on account of the large number of constituents it is almost impossible to ensure a complete separation of any constituent by means of any preliminary partial liquefaction.

In beginning the experimental work upon the problem of separation it was realized that an important step would be accomplished if we were able to separate by partial liquefaction combined with a preliminary high pressure rectification, the incoming mixture into two portions, one of which would be free from ethylene and the other of which would be free from propylene. Our preliminary experiments were directed toward this end and in order to satisfactorily accomplish this result a special type of combined condenser and high pressure rectifier was developed. This part of the apparatus will be described later in the specification.

Furthermore there is the problem of producing the necessary refrigerative effect to cause condensation of the various portions of the mixture which must be reduced to the liquid state preliminarily to the employment of the process of rectification. We were enabled to discover a sequence of steps such that the low temperature refrigeration necessary to be produced is obtained by the expansion in an expansion machine of a hydrogen-methane uncondensed residue. This expansion takes place without liquid appearing in the expansion machine exhaust and with the removal of substantially all of the ethylene from the expanded fluid. These are two indications of the long experimental campaign in which we engaged during the development of this process.

The method as a whole is characterized by the feature that the separation is accomplished in a series of steps. The first step is to divide the incoming mixture into portions of varying volatility and temperature, each of which is subsequently and continuously treated in order to separate them completely into their constituents. For example, the first separation of the compressed incoming mixture consists in segregating by themselves all constituents of boiling points equal to or higher than that of propylene, for example, butane, butylene, propane, propylene. From the remainder of the incoming mixture, which may still contain small percentages of propylene, is separated, as the second step, a portion containing the remainder of the propylene, a major portion of the ethane and a considerable portion of the ethylene. This fraction is then admitted to an intermediate level of a rectifier wherein it cascades over trays of the usual type. The remainder of the mixture, still in the vapor condition and at the original pressure and containing appreciable percentages of ethylene and substantially all the methane and hydrogen, is again separated by selective liquefaction into two portions one of which in the liquid state consists of a large part of the remaining ethylene plus substantial portions of the methane. The other portion, uncondensed, still at the original pressure, consists mainly of hydrogen and methane and this enters an exchanger system wherein substantially all the remaining ethylene is liquefied out together with some methane. The residual vapor passes to an expansion engine wherein its pressure is lowered to about one atmosphere with the performance of external work. The liquid mixtures of ethylene and methane are separated in an auxiliary rectifier into practically pure methane and a high ethylene-bearing liquid, the latter passing thence to the main rectifier. The first separated fraction consisting of propylene and constituents of higher boiling point is separated in an auxiliary rectification column as hereinafter described in detail.

The invention will be described with reference to the separation of a typical composition or mixture hereinbefore described in apparatus illustrated in the drawing and suitable for the accomplishment of the intended purpose. It will be understood that such description is illustrative and subject to modification in treating compositions or mixtures which may vary widely in the constituents and the proportions thereof present depending upon the source of the initial mixture and the previous treatment to which it may have been subjected.

The gaseous mixture is supplied at an initial pressure sufficient for the purpose, for example, about 150 pounds per square inch through an inlet pipe 5 to an exchanger 6 wherein it is cooled by heat exchange with outgoing products of the separation. The cooled product which may be partially liquefied is delivered by a pipe 7 to the lower section 8 of a rectification column 9. The section 8 is provided with the usual trays 10, equipped with hats 11, to permit liquid to flow downwardly and countercurrent to vapors arising from such liquid, together with the gaseous mixture introduced through the pipe 7. The gaseous mixture and accompanying vapors pass upwardly through the trays 10 to the tubes 12 of a condenser which is surrounded by liquid products of a further separation hereinafter described. The resulting partial liquefaction and rectification of the liquids and vapors in section 8 of the column results in a separation of the initial gaseous mixture into two fractions. The liquid fraction which accumulates in the bottom of section 8 consists primarily of propylene and constituents boiling at higher temperatures, together with a small proportion of the ethane present in the initial gaseous mixture. This liquid is heated by supplying any suitable heating medium, preferably at about room temperature, to the coil 13 in order to facilitate separation of constituents boiling at temperatures lower than the boiling point of propylene. The vapor fraction rises through section 8 and assists in the rectification of the descending liquid. The liquid which accumulates in the bottom of section 8 is withdrawn through a pipe 14 and subjected to further treatment as hereinafter described.

A portion of the liquid condensed in the tubes 12 and consisting of approximately 70% ethylene, the remainder being principally ethane and methane, is collected in a trough 15 at the top of section 8 and is withdrawn through a pipe 16 for further treatment as hereinafter described. The initial separation thus produces two liquid fractions and one vapor fraction of quite different composition. One of these liquid fractions contains all of the propylene present in the initial mixture. The other liquid fraction together with the vapor fraction contain all of the ethylene. These desirable constituents are separated from contaminating impurities by the further treatment mentioned.

The uncondensed residue from the tubes 12 is delivered through a pipe 17 to the tubes 18 of a condenser within the column 9 and surrounded by a liquid consisting largely of ethylene. The resulting condensation produces a liquid consisting of ethylene, ethane and methane, which escapes through a pipe 19 and is subjected to further treatment as hereinafter described. The uncondensed residue consisting principally of hydrogen and methane but containing a small amount of ethylene is delivered through a pipe 20 to an exchanger 21 wherein it is subjected to the cooling effect of the expansion, in expansion engine 27, of the hydrogen and methane residue, together with a portion, if desirable, of the effluent of column 34. Thus in the exchanger 21 the ethylene constituent is liquefied together with some methane and leaves through a pipe 22. The balance of the residue passes through a pipe 23 to another section 24 of the exchanger 21, wherein its temperature is raised, and thence through a pipe 25 and valve 26 to an expansion engine 27. A pipe 28 delivers the expanded product to a section 29 of the exchanger 21 where it gives up a portion of its cold to the gases in the section 21a. The residue consisting of hydrogen and methane is delivered then through a pipe 30 for further use as hereinafter described.

The liquid from the trough 15 passes through the pipe 16 to an exchanger 31 and thence through a pipe 32 and valve 33 to the lowest section of an auxiliary column 34 which is provided with the usual trays 35, equipped with hats 36, to facilitate rectification of liquids and vapors passing through the column. The liquid from the tubes 18 is delivered by the pipe 19 through a valve 37 to an intermediate section of the column 34. The liquid from the exchanger 21 is delivered by the pipe 22 through a valve 38 also to an intermediate section of the column 34. The rectification is completed in the column 34 by supplying liquid methane to the top thereof. To accomplish this purpose and to afford additional refrigeration, a portion of the effluent from the column 34 escaping through the pipe 39 is delivered through a pipe 40 to an exchanger 41 and passes thence through a pipe 42 and exchanger 43 to a compressor 44 where it is recompressed to a relatively high pressure, for example 500 pounds per square inch. The compressed gas returning through a pipe 45 and the exchanger 43 is delivered by a pipe 46 to a cooling coil 47 immersed in liquid surrounding the tubes 18; thence through a pipe 48 and exchanger 41 through a valve 49 to the upper end of the column 34. The reflux liquid thus provided washes ethylene and ethane from the gases rising in the column, so that the effluent escaping through the pipe 39 consists principally of methane. The portion which is not recycled in the manner described passes through a valve 50 to exchanger 21 wherein it assists in producing liquid in section 21a and escapes through the pipe 30 hereinbefore described.

The auxiliary rectification affords a supply of liquid consisting principally of ethylene and ethane which is delivered through an inlet 51 to the column 9 at about the level of the condenser tubes 18 and accumulates around such tubes, being vaporized by heat exchange with the gases within the tubes.

To afford a reflux of substantially pure ethylene, the effluent from the column 9 is delivered through the pipe 52 to an exchanger 53 and thence through a pipe 54 to an exchanger 55. It passes thence through pipe 56, exchanger 57, pipe 58, exchanger 59 and pipe 60 to a compressor 61 wherein a portion of the effluent is recompressed to a relatively high pressure, for example, 160 to 1000 pounds per square inch. A part of the ethylene which is one of the desired products of the separation is withdrawn through a pipe 62 and valve 63. The portion which is recompressed is delivered through a pipe 64, exchanger 59 and pipe 65 to a coil 66 in the bottom of an auxiliary column 67, hereinafter described wherein it is cooled and returns through a pipe 68 to the exchanger 57 and thence through a pipe 69 to a coil 70 immersed in liquid surrounding the tubes 12 wherein it is cooled. The fluid is then conveyed through a pipe 71 to the exchanger 53 and thence through a pipe 72 and valve 73 to the top of the column 9. The pure ethylene liquid reflux thus provided flows downwardly over trays 74 provided with the usual hats 75 and washes from the rising vapors the ethane constituent of such vapors, so that the liquid accumulating around the tubes 12 at the lower end of the column 9 consists of ethylene and ethane, the latter constituent being in excess. Pure ethylene, as hereinbefore indicated, is withdrawn as the effluent of the rectification in the column 9, and thus one of the desired constituents is separated from the initial gaseous mixture substantially free from contaminating constituents.

As hereinbefore indicated, the propylene constituent is separated in the initial liquefaction operation and is withdrawn with other constituents of higher boiling point through the pipe 14. This liquid is delivered by the pipe 14 to an exchanger 76 and thence through a pipe 77 and valve 78 into an intermediate level of the rectification column 67 which is provided with the usual trays 79 and hats 80. The liquid flowing downwardly through the rectifier collects at the bottom and is boiled by the ethylene in the coil 66. The constituents boiling at lower temperatures pass upwardly through the column and out at the top. The residual liquid passes through a valve 81 and pipe 82 into a second rectification column 83 having trays 84 and hats 85 and being provided at its lower end with a coil 86 which may be supplied with any suitable heating medium. The vapor from the liquid returns to the column 67 through a pipe 87. The residual liquid escapes through a valve 88 and pipe 89 to the exchanger 6 and thence is withdrawn. This fraction will consist of butylene, butane, and any other constituents present, the boiling points of which are higher than that of butylene.

A portion of the vapors rising through the column 67 is diverted into an auxiliary rectification column 90 and condenser tubes 92, around which the cold gases from the pipe 30, consisting of hydrogen and methane, circulate to liquefy the more readily condensible constituents of the rising vapors. The cooling medium escapes through a pipe 93 to the exchanger 76 and thence through a pipe 94 to the exchanger 6, being withdrawn as a mixture of methane and hydrogen. The effluent from the auxiliary column 90 consists of propylene and is withdrawn through a pipe 95 and valve 96 to the exchanger 76 and thence through a pipe 97 to the exchanger 6. The propylene is withdrawn as a substantially pure product and one of the desirable recovered constituents.

The remaining vapor rising through the column 67 enters tubes 98 of a condenser which is surrounded by liquid and/or vapor supplied from the column 3 through pipes 99 and 100 controlled by valves 101 and 102. The cooling agent escapes through a pipe 103 controlled by valve 104 to a pipe 105 and is joined by the effluent from the column 67 which escapes through a pipe 106 controlled by valve 107. Condenser 98 is provided with a purge valve 104a. The pipe 105 delivers these products to the exchanger 76, whence they escape through a pipe 108. At this point they are mixed with the impure propane vapors issuing from an intermediate level of rectifier 83. The combined vapors pass through pipe 108 to exchanger 6 and are withdrawn therefrom as a mixture of propane and ethane.

Thus, as described, the initial mixture is separated by a succession of steps, of which the first is the important one of splitting the gaseous mixture into two fractions, one of which contains substantially all of the propylene, and the other of which contains substantially all of the ethylene, with further steps to separate the various impurities from the ethylene and the propylene, the desired constituents of the gaseous mixture. These constituents are recovered in substantial purity. Methane and hydrogen are withdrawn together, as are also propane and ethane, and butane and butylene, together with other constituents boiling at higher temperatures.

A particular advantage of the method as described is the avoidance of external refrigeration, the application of which would involve very considerable difficulty in the successful separation of the desired constituents. The most important features of this process in respect to the method of refrigeration are two in number. (1) The necessary refrigeration at the cold end of the system is obtained by means of expansion of all the uncondensed residues in the system in an expansion machine with external work. (2) The refrigeration necessary at the high temperature end of the system is accomplished in the particularly advantageous manner shown by means of the auxiliary closed ethylene recompression cycle used for the production of the necessary reflux liquid with the use of throttle expansion.

As hereinbefore indicated, various modifications may be made in the cycle and parts thereof may be eliminated in the event that the constituents designed to be separated thereby are not present in the initial gaseous mixture.

The expression "rectifier with the usual trays and hats" should be interpreted throughout the specification to indicate any type of rectifier commonly used in industry.

Various changes may be made, therefore, in the procedure and in the apparatus utilized therefor without departing from the invention or sacrificing any of the advantages thereof.

We claim:

1. The method of recovering ethylene and propylene separately and in substantial purity from complex gaseous mixtures containing these constituents and including methane, ethane and propane which comprises separating from the compressed gaseous mixture by liquefaction at the same pressure liquid fractions, one of which includes substantially all of the propylene and the other the major portion of the ethylene, and thereafter rectifying the liquid fractions to separate the desired constituents from other constituents of such fractions.

2. The method of recovering ethylene and propylene separately and in substantial purity from complex gaseous mixtures containing these constituents and including methane, ethane and propane which comprises separating from the compressed gaseous mixture by liquefaction at the same pressure liquid fractions, one of which includes substantially all of the propylene and the other the major portion of the ethylene, and thereafter rectifying the liquid fractions to separate the desired constituents from other constituents of such fractions, and maintaining the refrigeration required for the separation by recompression of separated constituents, thereby avoiding external refrigeration.

3. The method of recovering ethylene and propylene separately and in substantial purity from complex gaseous mixtures containing these constituents and including methane, ethane and propane, which comprises separating from the compressed gaseous mixture by liquefaction at the same pressure liquid fractions, one of which includes substantially all of the propylene and the other the major portion of the ethylene, discarding the gaseous residue and rectifying the liquid fractions to separate the desired constituents from the other constituents of such fractions.

4. The method of recovering ethylene and propylene separately and in substantial purity from complex gaseous mixtures containing these constituents and including methane, ethane, and propane, which comprises separating from the compressed gaseous mixture by liquefaction at the same pressure liquid fractions, one of which includes substantially all of the propylene and the other the major portion of the ethylene, discarding the gaseous residue, rectifying the liquid fractions to separate the desired constituents from the other constituents of such fractions, and maintaining the refrigeration required for the separation by recompression of separated constituents, thereby avoiding external refrigeration.

5. The method of recovering ethylene and propylene separately and in substantial purity from complex gaseous mixtures containing these constituents and including methane, ethane, and propane, which comprises separating from the compressed gaseous mixture by liquefaction a plurality of liquid fractions, one of which includes substantially all of the propylene and the others substantially all of the ethylene, subjecting the ethylene fractions to an auxiliary rectification to separate constituents of lower boiling point therefrom, and then to rectification from which the ethylene is withdrawn as the gaseous effluent.

6. The method of recovering ethylene and propylene separately and in substantial purity from complex gaseous mixtures containing these constituents and including methane, ethane, and propane, which comprises separating from the compressed gaseous mixture by liquefaction a plurality of liquid fractions, one of which includes substantially all of the propylene and the others substantially all of the ethylene, subjecting the ethylene fractions to an auxiliary rectification to separate constituents of lower boiling point therefrom, and then to rectification from which the ethylene is withdrawn as the gaseous effluent, and treating the liquid propylene fraction to separate other constituents therefrom.

7. The method of recovering ethylene and propylene separately and in substantial purity from complex gaseous mixtures containing these constituents and including methane, ethane and propane, which comprises separating from the compressed gaseous mixture by liquefaction a plurality of liquid fractions, one of which includes substantially all of the propylene and the others substantially all of the ethylene, discarding the unliquefied residue, subjecting the ethylene fractions to an auxiliary rectification to separate constituents of lower boiling point therefrom, and then to rectification from which the ethylene is withdrawn as the gaseous effluent.

8. The method of recovering ethylene and propylene separately and in substantial purity from complex gaseous mixtures containing these constituents and including methane, ethane and propane, which comprises separating from the compressed gaseous mixture by liquefaction a plurality of liquid fractions, one of which includes substantially all of the propylene and the others substantially all of the ethylene, discarding the unliquefied residue, subjecting the ethylene fractions to an auxiliary rectification to separate constituents of lower boiling point therefrom and then to rectification from which the ethylene is withdrawn as the gaseous effluent, and treating the liquid propylene fraction to separate other constituents therefrom.

9. The method of recovering ethylene and propylene separately and in substantial purity from complex gaseous mixtures containing these constituents and including methane, ethane, and propane, which comprises separating from the compressed gaseous mixture by liquefaction a plurality of liquid fractions, one of which includes substantially all of the propylene and the others substantially all of the ethylene, subjecting the ethylene fractions to an auxiliary rectification to separate constituents of lower boiling point therefrom, and then to rectification from which the ethylene is withdrawn as the gaseous effluent, and maintaining the refrigeration required for the separation by recompression of separated constituents, thereby avoiding external refrigeration.

WALTER WILKINSON.
JOSEPH L. SCHLITT.

Certificate of Correction

Patent No. 2,035,516.                                                      March 31, 1936.

WALTER WILKINSON ET AL.

It is hereby certified that errors appear in the printed specification of the above numbered patent requiring correction as follows: Page 1, second column, line 26, for "met" read *meet;* line 52, for "+9.5" read *+1.0;* and line 53, for "+27.95" read *+9.5;* page 4, first column, line 62, for "unconsensed" read *uncondensed;* and second column, line 11, claim 1, for "probylene" read *propylene;* and that the said Letters Patent should be read with these corrections therein that the same may conform to the record of the case in the Patent Office.

Signed and sealed this 28th day of April, A. D. 1936.

[SEAL]                                                               LESLIE FRAZER,
*Acting Commissioner of Patents.*